United States Patent
Klopp, III et al.

(10) Patent No.: US 6,851,736 B1
(45) Date of Patent: Feb. 8, 2005

(54) VEHICLE CONSOLE

(75) Inventors: John A. Klopp, III, Hermosa Beach, CA (US); Michael Tsay, Irvine, CA (US); David W. Carter, Cable, OH (US); Yukio Akimoto, Raymond, OH (US); Clarissa McPeck, Pasadena, CA (US); Maki Yamaguchi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/662,821

(22) Filed: Sep. 16, 2003

(51) Int. Cl.[7] .................................................. B60N 3/00

(52) U.S. Cl. .................. 296/37.8; 296/24.34; 296/208; 224/926

(58) Field of Search ............................. 296/37.8, 24.34, 296/208; 224/926, 539

(56) References Cited

U.S. PATENT DOCUMENTS

| | | | |
|---|---|---|---|
| 6,116,674 A | * | 9/2000 | Allison et al. ............. 296/37.8 |
| 6,231,098 B1 | * | 5/2001 | Schenk et al. ............. 296/37.8 |
| 6,726,267 B2 | * | 4/2004 | Kim et al. ................. 296/37.8 |

* cited by examiner

Primary Examiner—Joseph D. Pape
(74) Attorney, Agent, or Firm—Sterne, Kessler, Goldstein & Fox P.L.L.C.

(57) ABSTRACT

A vehicle console has multiple storage areas and multiple access points. The vehicle console includes a housing and first through third modules. The housing has first and second sections. The first module is slidingly coupled to the housing and configured to slide over the first section. The second module is slidingly coupled to the housing and the first module and configured to slide over the first and second sections. The third module pivotally coupled to the housing and pivotally moveable between a first position substantially covering the second section and a second position substantially uncovering the second section.

20 Claims, 9 Drawing Sheets

VEHICLE CONSOLE

BACKGROUND OF THE INVENTION

1. Field of the Invention

The present invention is related to a vehicle console.

2. Background Art

Vehicles have transitioned from being merely transportation to being engrained in all aspects of daily life for many people. Through this transition, how consumers use their vehicles has also changed. For example, vehicles have become mobile offices and lunchrooms for people on the move. In view of these new uses for vehicles, manufacturers continue to add features and increase areas in the vehicles used to store items, hold items, power items, etc.

One storage area that often varies significantly from vehicle to vehicle and has seen great change in recent years is the console positioned between the driver's seat and the passenger's seat. Consoles have dramatically increased in size and functionality, especially in larger vehicles (e.g., mini vans, sport utility vehicles, and trucks). The newest consoles have multiple areas for storage, air ducts for air conditioning and heat, power outlets for computers and phones, multiple container holders for drinks and food, lights, and the like. However, most consoles continue to have a single opening or way to access the interior of the console. This can make accessing the various areas of the console burdensome and reduce the effectiveness of any compartment offered by the console.

Therefore, what is needed is a console that has multiple storage areas and multiple ways in which to access the multiple storage areas.

BRIEF SUMMARY OF THE INVENTION

Embodiments of the present invention provide a vehicle console. The vehicle console has a housing defining a storage area therein. The storage area has a first portion and a second portion. A first module is slidingly coupled to the housing and is slidable between a retracted position and an extended position with respect to the housing. The first module covers the first portion of the storage area when in the retracted position. A second module is slidingly coupled to the housing and to the first module. The second module is slidable between a first position retracted into the first module and a second position extended outward from the first module. The second module covers the second portion of the storage area when the second module is in the second position and the first module is in the retracted position. A third module is pivotally coupled to the housing and movable between a first position covering the second portion of the storage area and a second position allowing access to the second portion of the storage area.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1, 2, and 3 show perspective views of a vehicle console including a first portion that moves into and out of a housing according to an embodiment of the present invention.

FIGS. 8, 9, 10, 11, and 12 show portions of a vehicle console in several positions according to embodiments of the present invention.

Figure 13:
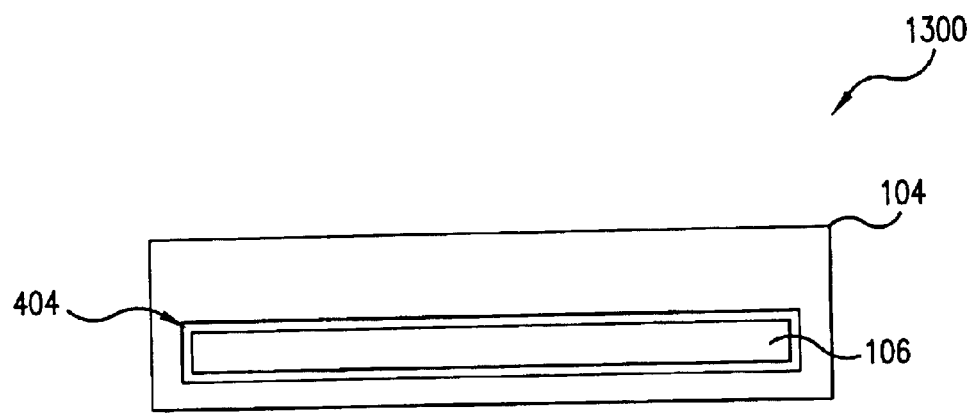
Figure 14:
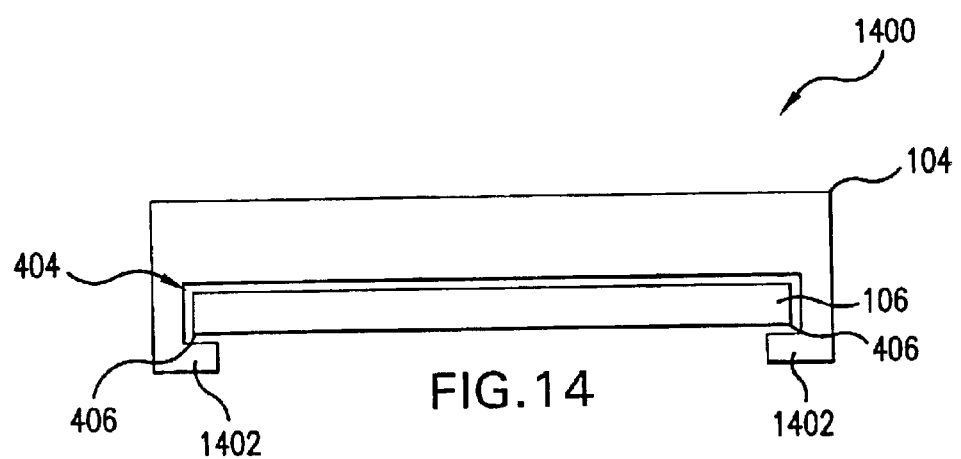

FIGS. 13-14 shows various systems for allowing a second module to be retracted into a first module according to various embodiments of the present invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

Figure 1:
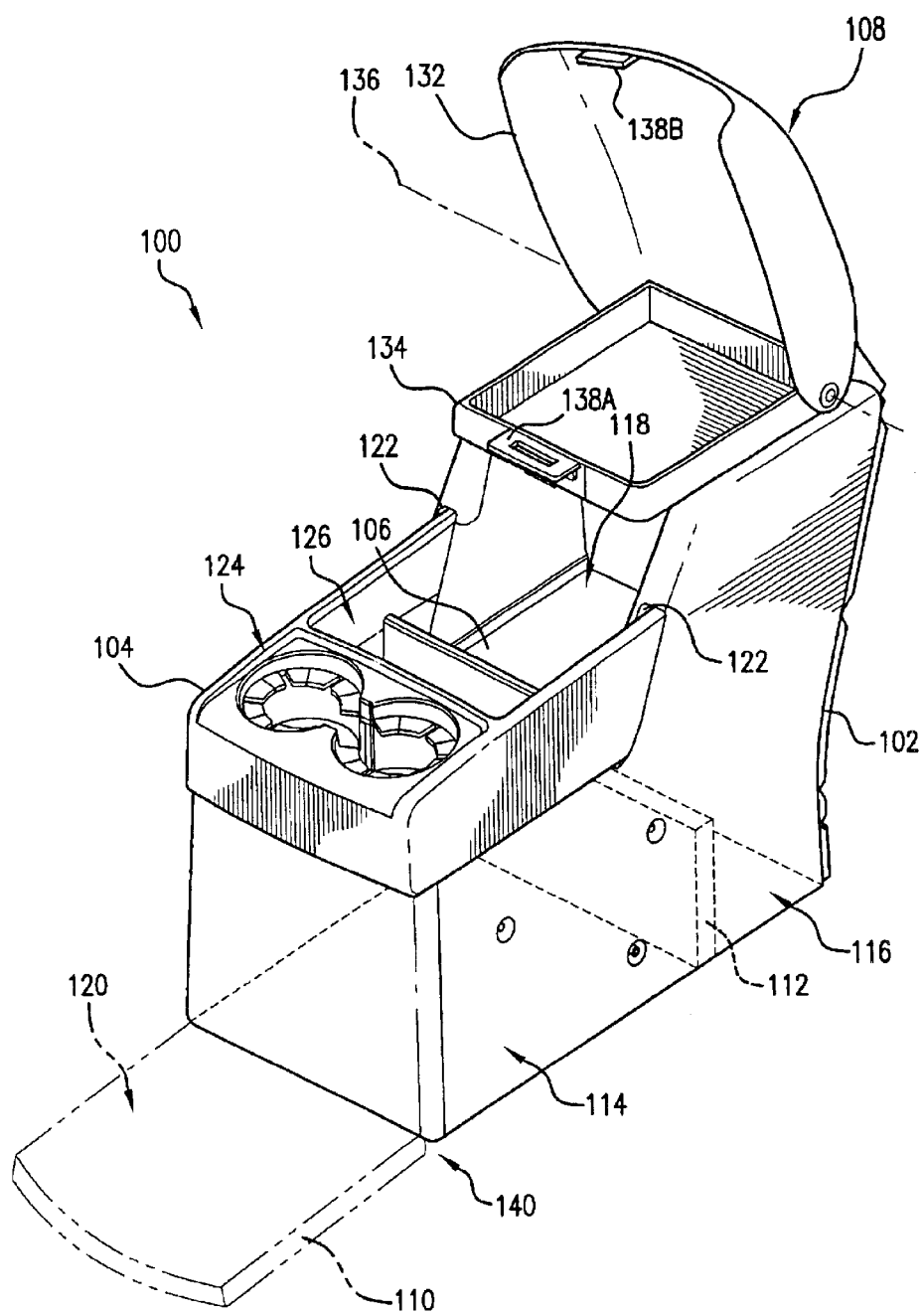
Figure 2:
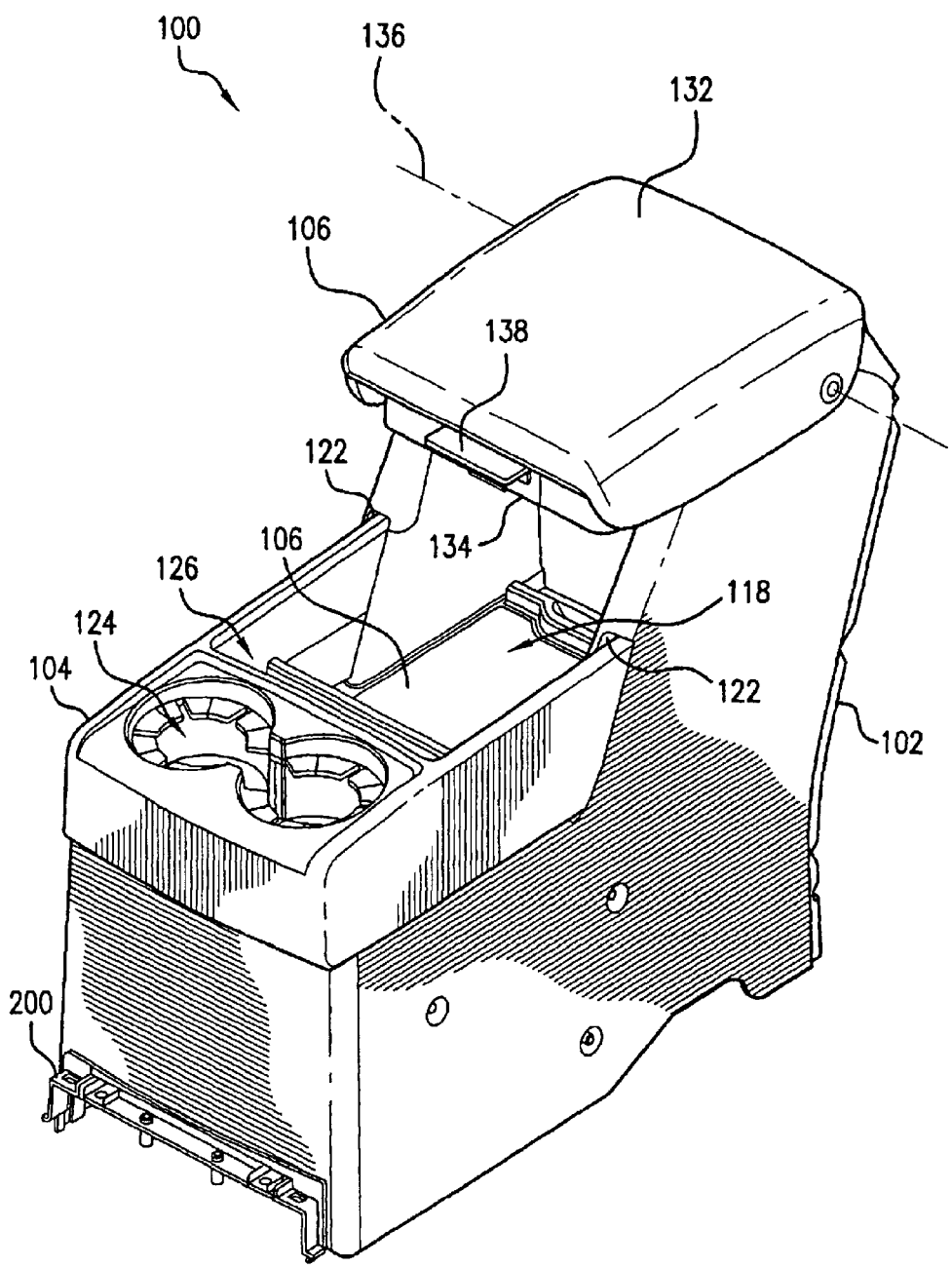
Figure 3:
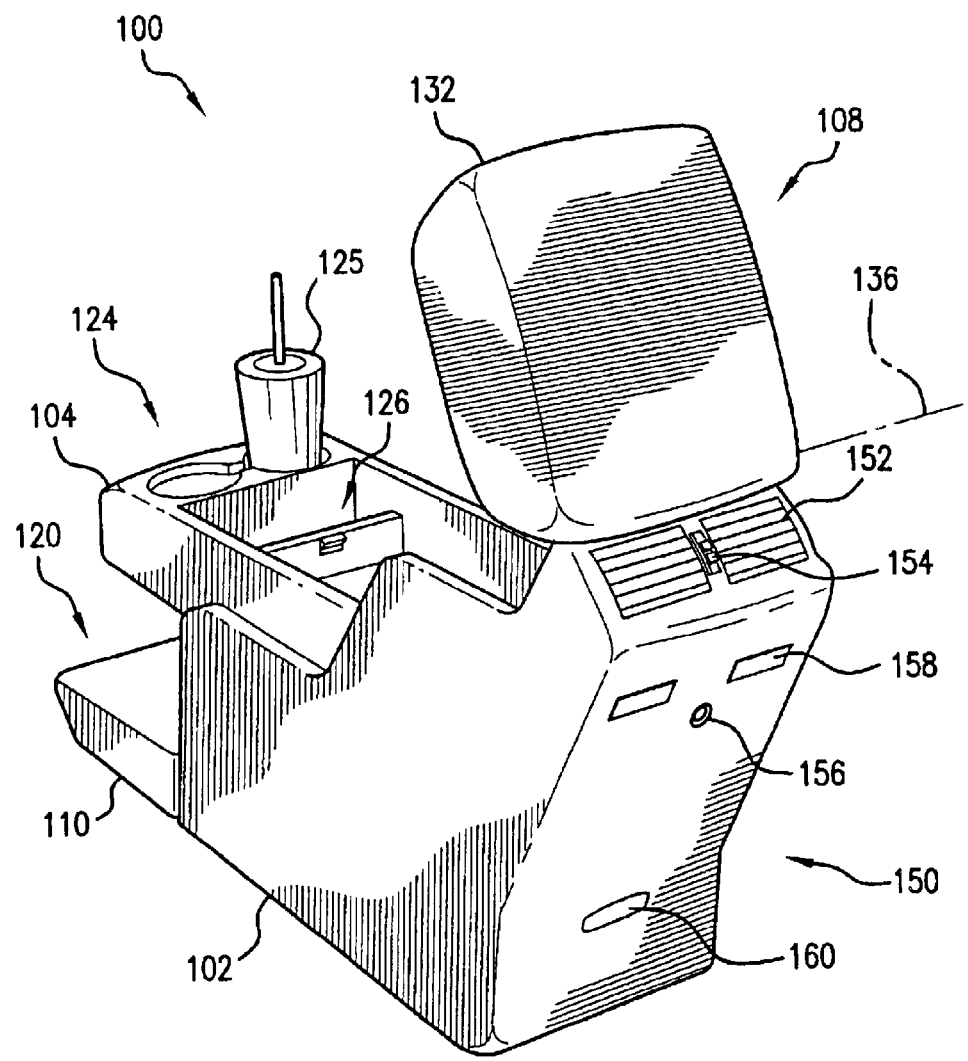
Figure 4:
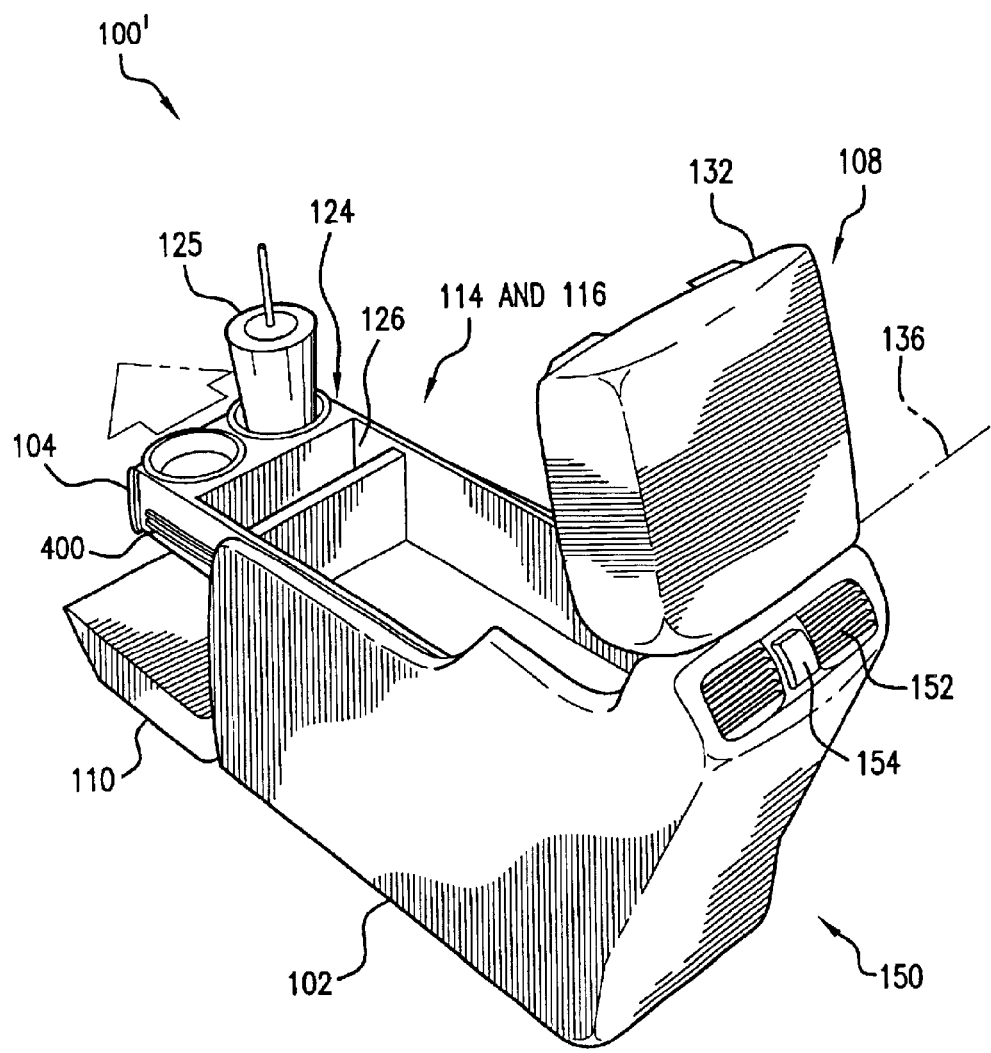
FIGS. 4 and 5 show perspective and side views of a vehicle console including a first portion that moves along inside surfaces of a housing according to another embodiment of the present invention.
Figure 5:
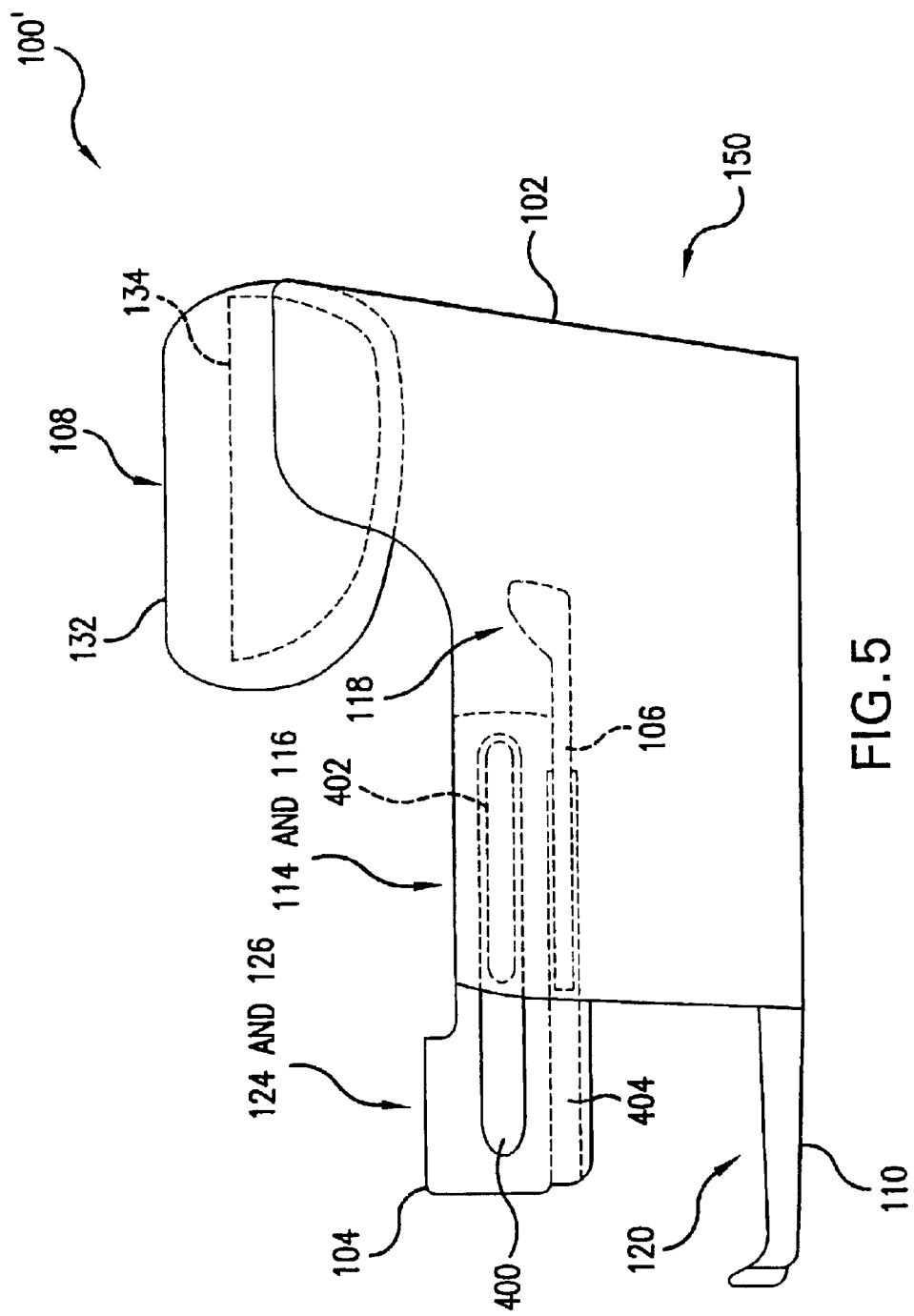

FIGS. 1-3 show a first embodiment of a vehicle module in which a first portion 104 slides along a housing 102 and into and out of openings 122 in the housing 102. FIGS. 4-5 show a second embodiment of a vehicle module in which a groove 400 in the first portion 104 slides along a rail 402 on an inside surface of the housing 102.

Vehicle Console with a First Module Retracting into a Housing

FIGS. 1-3 show various perspective views of a vehicle console 100 according to an embodiment of the present invention. Vehicle console 100 includes a housing 102, a first module 104, a second module 106, a third module 108, and an optional fourth module 110 (FIGS. 1 and 3). In one embodiment, housing 102 can include a divider 112 (shown in phantom in FIG. 1) that defines first and second sections or storage areas 114 and 116. A third storage area 118 is defined between second module 106 and third module 108. A fourth storage area 120 is proximate fourth module 110.

Figure 6:
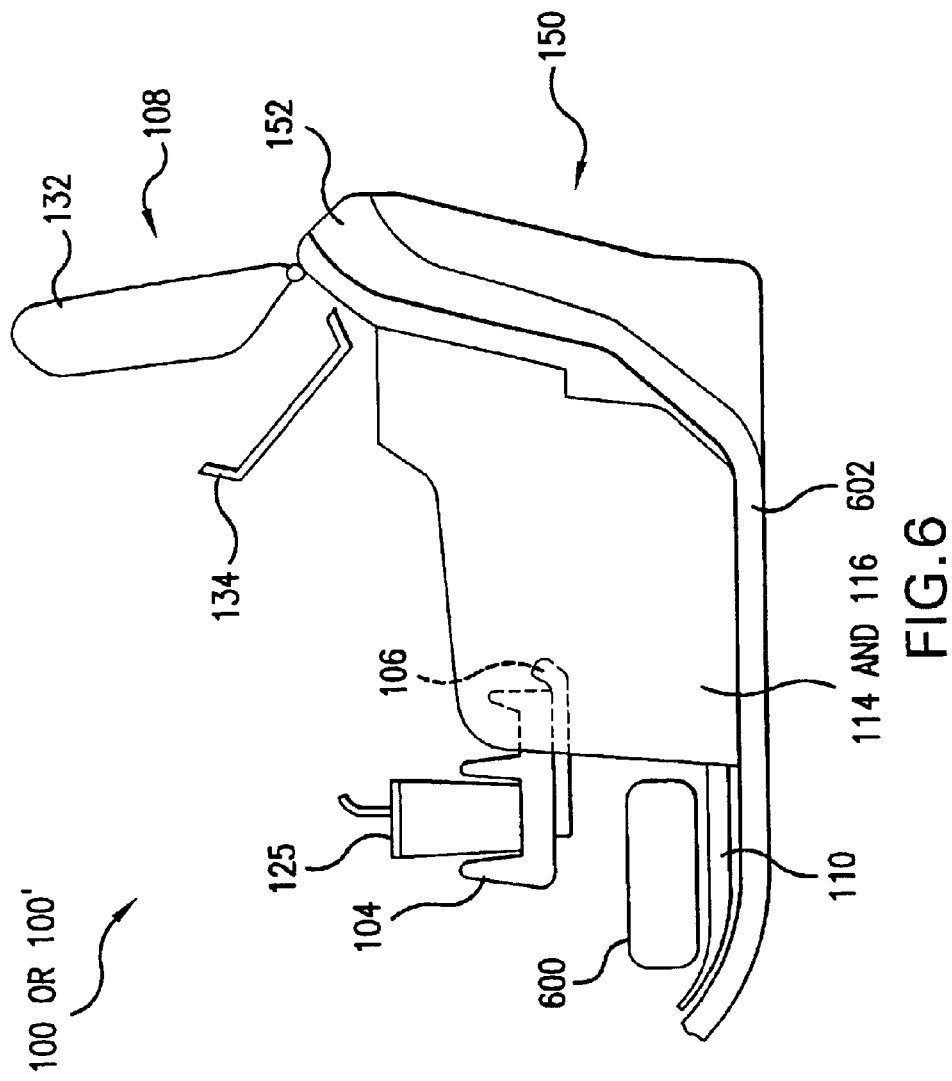
FIGS. 6 and 7 show cross-sectional views of the vehicle console in FIGS. 1-3 or 4-5.

In one embodiment, first and second storage areas 114 and 116 can be part of one storage area with no divider, as best seen in FIGS. 4 and 6. In another embodiment (not shown), there can be multiple dividers defining multiple storage areas. In yet another embodiment, vertical tracks are coupled to or molded into inside surfaces of housing 102 in first storage area 114 in order to hold compact disc cases, magnetic cassette cases, or the like. All these alternative embodiments, and others not discussed, would be apparent to one of ordinary skill in the art having benefit of this disclosure, and they are contemplated within the scope of the present invention.

First module 104 is slidingly coupled to housing 102. First module 104 slides into and out of openings 122 in housing 102, while being supported by housing 102. First module 104 can be moved between an extended position (FIG. 3) and a retracted position (FIGS. 1-2). When in a retracted position, first module 104 covers first storage area 114. When in an extended position, with second module 106 retracted therein (discussed in more detail below with respect to FIGS. 5 and 8-12), first storage area 114 is uncovered and readily accessible.

First module 104 can include a first holding device 124 and a second holding device 126. First holding device 124 is configured to hold a first type of container 125 (FIGS. 3, 4, and 6) (e.g., a beverage or fluid container). Second holding device 126 is configured to hold a second type of container (e.g., french or freedom fries available from fast food restaurants, a snack bag of chips or pretzels, etc.). For example, second holding device 126 can be configured to hold the second type of container securely in an upright position, so that the second type of container is easy accessible and won't move. Thus, if the second type of container is a french or freedom fry bag, a user can "wedge" the container in second holding device 126 and eat them without having to move the container to access them and without having the container fall over and spill its contents.

Second module 106 can be a tray, a cover, or the like, and is slidingly coupled to first module 104 and housing 102. When in a first, extended position, tray 106 covers at least part of first and second storage areas 114 and 116. In various embodiments, tray 106 can be of various lengths, which will determine how much of first and second storage areas are covered. Also, in the first, extended position second module 106 and third module 108 can define a third storage area 118. In this extended position, tray 106 can be used to hold a container (e.g., a hot or cold food container, such as a fast food bag or tray, a salad container, etc.).

Tray 106 can also be moved to a second, partially or fully retracted position (i.e., retracted into first module 104). In the second, retracted position either one or both of the first and second storage areas 114 and 116 can be partially or fully uncovered and can be readily accessible.

There are various ways for tray 106 to be retracted into first module 104. In FIG. 13, one embodiment shows a system 1300, in which tray 106 can be received and held in an opening 404 (FIG. 5) (e.g., a cavity) of first module 104, so tray 106 is surrounded on three sides by first module 104. In FIG. 14, a second embodiment shows a system 1400, in which two, opposite edges 406 of tray 106 can be received by lips 1402 that extend from first module 104, such that tray 106 is held in opening 404. It is to be appreciated that various other complementary devices can also be used to allow tray 106 to be retracted into and held by first module 104. Once retracted, tray 106 can be moved with first module 104.

Referring back to FIGS. 1-3, third module 108 is pivotally coupled to housing 102, and moves between a first position (e.g., down) covering second storage area 116 and third storage area 118, and a second position (e.g., up) allowing access to second storage area 116 and third storage area 118. Complete access to storage area 116 is determined by a position of tray 106. This can be seen as making second storage area 116 a "secret" or a "hidden" storage area from a perspective of a person looking into a window (not shown) of the vehicle.

Third module 108 includes an armrest 132 and a storage bin 134. Armrest 132 is pivotally coupled to housing 102. Storage bin 134 is coupled to arm rest 132 and can pivot with armrest 132 about a common axis 136. A latching mechanism 138 (138A and 138B) releasably secures storage bin 134 to arm rest 132. Latching mechanism 138 can be used to permit storage bin 134 and armrest 132 to be pivoted together. In one embodiment, when latching mechanism 138 is secured, storage bin 134 is enclosed within (e.g., retracted substantially into) an area of armrest 132. In another embodiment, when latching mechanism 138 is secured, storage bin 134 may rest below armrest 132. Other configurations are also contemplated within the scope of the present invention.

Fourth module 110 (FIGS. 1 and 3) is optional. When included, fourth module 110 can be coupled to extend from a base edge 140 of housing 102 using coupling device 200 (FIG. 2). Fourth module 110 can be a cargo bin, support shelf, platen, or the like, for holding daily use items 600 (FIG. 6) that cannot be or do not have to be stored in console 100. For example, a lunch box, a toolbox, a bag, or the like, can be held by support device 110. This allows a user to easily store such item 600 in a place that keeps item 600 from sliding around a floor (not shown) of the vehicle. As shown in FIG. 6, support device 110 can have a curved or convex shape to restrain items 600 from lateral movement during movement of the vehicle.

As best seen in FIG. 3, a rear portion 150 of console 100 can include various features. For example, rear portion 150 may include air conditioning/heating vents 152 with a controller 154 for moving the vents 152, a power outlet 156, tie down points or holding devices 158, and a light 160. It is to be appreciated that still further features known to skilled artisans can be included in rear portion 150, as are contemplated within the scope of the present invention.

Vehicle Console with a First Module Sliding Along a Housing

FIGS. 4 and 5 show a vehicle console 100' according to an embodiment of the present invention. All aspects and functionality of console 100' are the same as console 100, except in this embodiment first portion 104 includes a groove 400 that interacts with a rail 402 on housing 102. Groove 400 of first portion 104 slides along rail 402 of housing 102 as first portion 104 is retracted into or out of housing 102. In contrast, first portion 104 of console 100 (FIGS. 1, 2, and 3) slides into and out of openings 122 in housing 102. As discussed above, opening 404 in first portion 104 receives tray 106 when tray 106 is in a retracted position.

Venting and Power System in a Vehicle Console

Figure 7:
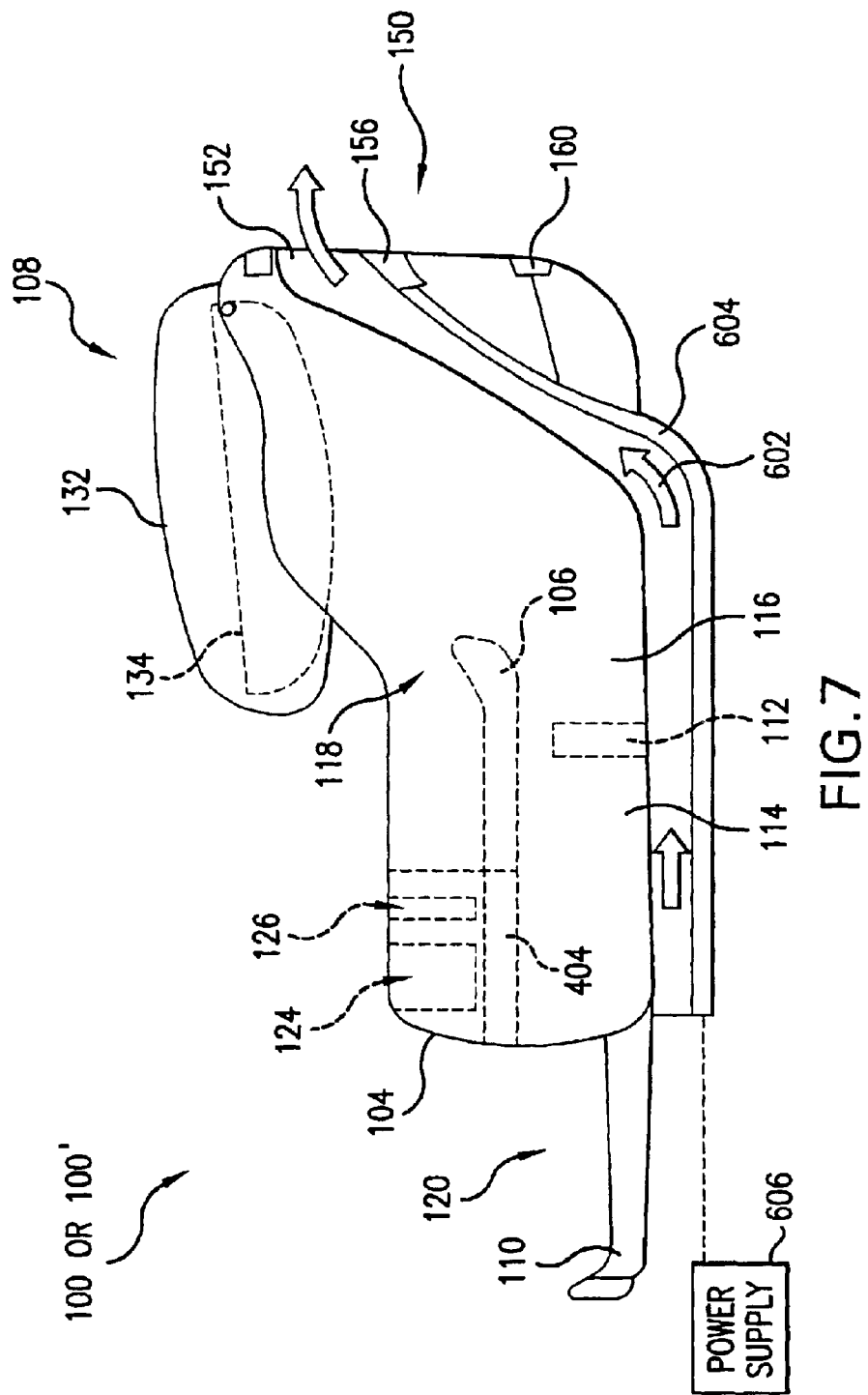

FIGS. 6 and 7 show additional features of console 100 or 100' according to embodiments of the present invention. As seen in FIG. 6, a vent 602 can run through or under console 100 or 100' to supply air from an air conditioning or heating system (not shown) through vent 152 to a rear of the vehicle. Also, a power line 604 can couple power outlet 156 and/or light 160 to a power supply 606, which can be a battery of the vehicle.

Positioning of First, Second, and Third Modules for Access to Storage Areas

FIGS. 8, 9, 10, 11, and 12 show various positions 802, 900, 1000, 1100, and 1200, respectively, of first module 104, second module 106, and third module 108, according to embodiments of the present invention. In these figures, third module 108 is located in a plane located along axis 800, which allows third module 108 to be located above both first module 104 and second module 106.

Figure 8:
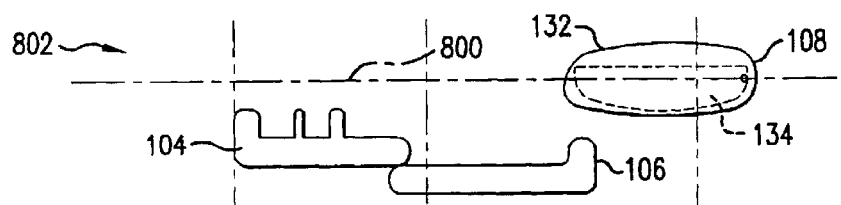

In FIG. 8, first and second storage areas 114 and 116 are shown substantially covered and substantially inaccessible. In position 802, first module 104 is in its retracted position, second module 106 is in its first, extended position, and third module 108 is in its first, down position. Also, position 800 allows second module 106 to be used as a tray to support a food container, or the like. Further, in position 802 storage bin 134 is in a closed or substantially inaccessible position (i.e., arm rest 132 is down).

Figure 9:
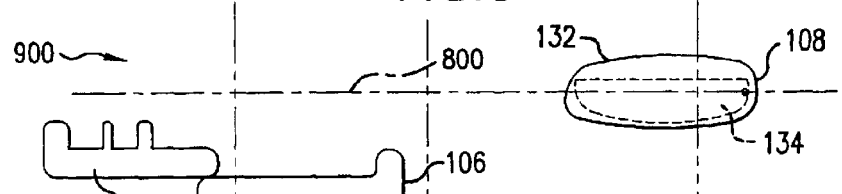

In FIG. 9, second storage area 116 can be partially uncovered and partially accessible, while first storage area 114 is substantially covered and substantially inaccessible. In position 900, first module 104 is in its extended position, second module 106 is substantially in its first, extended position, and third module 108 is in its first, down position. Also, position 900 allows second module 106 to be used as a tray to support a food container, or the like. Further, in position 900, storage bin 134 is in a closed or substantially inaccessible position (i.e., arm rest 132 is down).

Figure 10:
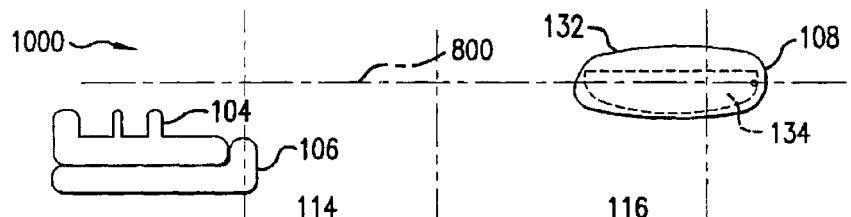

In FIG. 10, first storage area 114 is substantially uncovered and substantially accessible, while second storage area 116 can be partially covered and partially accessible. In position 1000, first module 104 is in its extended position, second module 106 is in its second, retracted position, and third module 108 is in its first, down position. Further, in position 1000, storage bin 134 is in a closed or substantially inaccessible position (i.e., arm rest 132 is down).

Figure 11:
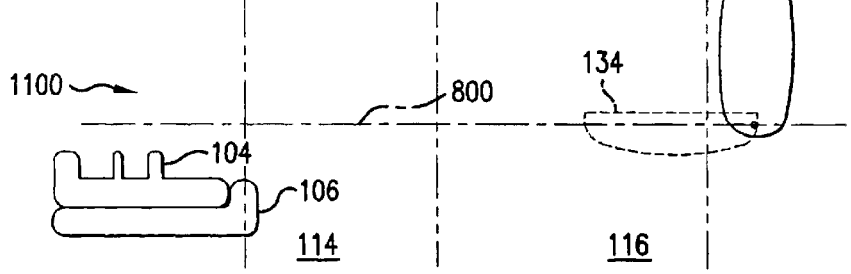

In FIG. 11, first storage area 114 is substantially uncovered and substantially accessible, while second storage area 116 is partially covered and partially accessible. In position 1100, first module 104 is in its extended position, second module 106 is in its second, retracted position, arm rest 132 is substantially in its second, up position and storage bin 134 is substantially in its first, down position. Also, in position 1100, storage bin 134 is in an open or substantially accessible position (i.e., arm rest 134 is up).

Figure 12:
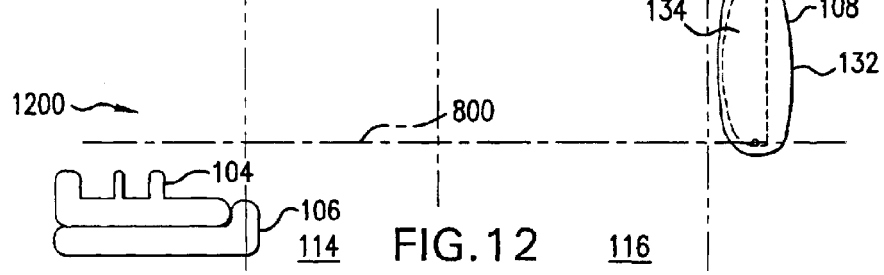

In FIG. 12, first storage area 114 and second storage area 116 are substantially uncovered and substantially accessible. In position 1200, first module 104 is in its extended position, second module 106 is in its second, retracted position, and third module 108 is in its second, up position. Also, in position 1200, storage bin 134 is in a closed or substantially inaccessible position (i.e., storage bin 134 is pivoted up with arm rest 132).

It is to be appreciated many other configurations are possible. For example, first storage area 114 is substantially covered and second storage area 116 is partially or completely accessible. In these positions, first module 104 is in its retracted position, second module 106 is in its second, retracted position. Thus, both are covering first storage area 114. However, in various embodiments, third module 108 can be down, allowing partial access to second storage area 116, or it can be up, allowing substantially complete access to second storage area 116. Also, in various embodiments, storage bin 134 can be pivoted up with arm rest 132 (allowing substantially complete access to second storage area 116) or they can be separated with arm rest 132 pivoted up and storage bin 134 down (allowing access to storage bin 134 and partial access to second storage area 116. These and other varying positional embodiments are shown throughout the figures above, and are contemplated within the scope of the present invention.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A vehicle console comprising:
    a housing defining a storage area therein, said storage area having a first portion and a second portion;
    a first module slidingly coupled to said housing and slidable between a retracted position and an extended position with respect to said housing, said first module covering said first portion of said storage area when in said retracted position;
    a second module slidingly coupled to said housing and to said first module, said second module being slidable between a first position retracted into said first module and a second position extended outward from said first module, said second module covering at least part of said second portion of said storage area when said second module is in said second position and said first module is in said retracted position; and
    a third module pivotally coupled to said housing and movable between a first position covering at least part of said second portion of said storage area and a second position allowing access to said second portion of said storage area.

2. The vehicle console of claim 1, further comprising:
    a second storage area formed between said second module in said second position and said third module in said first position.

3. The vehicle console of claim 1, wherein said third module comprises:
    an arm rest pivotally coupled to said housing;
    a storage bin coupled to said arm rest for pivoting with said arm rest about a common axis; and
    a latching mechanism to releasably secure said storage bin to said arm rest to permit said storage bin and said arm rest to be pivoted together.

4. The vehicle console of claim 1, further comprising an outlet that allows air from an air conditioning system of the vehicle to exit the console proximate a pivoting point of said third module.

5. The vehicle console of claim 1, wherein when said second module is in said first position and said first module is in said extended position, said second module covers said first portion of said storage area.

6. The vehicle console of claim 1, further comprising:
    a cargo tray extending from a base edge of the console.

7. The vehicle console of claim 1, further comprising a divider coupled to first and second opposite inside surfaces of the housing to divide the first and second portions.

8. The vehicle console of claim 1, wherein said first module includes a cavity that slidingly engages said second module.

9. The vehicle console of claim 1, wherein said first module includes first and second lips which slidingly engage first and second opposite edges of said second module.

10. The vehicle console of claim 1, wherein said first module comprises:
    a first holding section configured to hold a first type of container; and
    a second holding section configured to hold a second type of container.

11. The vehicle console of claim 10, wherein the first type of container comprises a beverage container.

12. The vehicle console of claim 10, wherein the second type of container comprises a food container.

13. The vehicle console of claim 1, further comprising:
    compact disk container holding devices.

14. A vehicle console, comprising:

a housing having first and second sections;

a first module slidingly coupled to the housing and configured to slide over the first section;

a second module slidingly coupled to the housing and the first module and configured to slide over the first and second sections; and a third module pivotally coupled to the housing, said third module being pivotally moveable between a first position substantially covering said second section and a second position substantially uncovering said second section.

15. The vehicle console of claim 14, wherein the second module is configured to retract into the first module.

16. The vehicle console of claim 14, wherein the third module comprises:

an arm rest pivotally coupled to said housing;

a bin coupled to said arm rest for pivoting with said arm rest about a common axis; and a latching mechanism to releasably secure said bin to said arm rest to permit said bin and said arm rest to be pivoted together.

17. The vehicle console of claim 14, wherein a storage area is defined between the second and third modules.

18. The vehicle console of claim 14, wherein the first module comprises:

a beverage container holding portion; and a food container holding portion.

19. The vehicle console of claim 14, further comprising a holding device extending from a base edge of the console proximate to a floor of the vehicle.

20. The vehicle console of claim 14, wherein the first section comprises a conpact disc holding device.

* * * * *